Reissued Nov. 16, 1926. Re. 16,477

UNITED STATES PATENT OFFICE.

ARTHUR BIDDLE, OF TRENTON, NEW JERSEY, ASSIGNOR TO UNITED PRODUCTS CORPORATION OF AMERICA, A CORPORATION OF DELAWARE.

CAOUTCHOUC COMPOSITION.

No Drawing. Original No. 1,437,487, dated December 5, 1922, Serial No. 397,173, filed July 19, 1920. Application for reissue filed December 4, 1924, Serial No. 753,972. Divided and this application filed February 25, 1926. Serial No. 90,699.

The invention relates to a composition of matter or a compound of the nature of rubber, gutta-percha, balata and like materials and adapted for use in like manner and for like purposes.

Among the objects of the invention is to incorporate or combine casein, or compositions containing casein as an essential element, with a rubber-like substance such as rubber, gutta-percha, balata and the like, or compositions thereof, in the form or state in which they exist as crude or refined latex.

Another object of the invention is to make a compound or composition of matter of the nature above mentioned, made by incorporating or combining casein with caoutchouc latex, which will be adapted for use in various arts, as for example, in the manufacture of tires, mats, linoleum substitutes, flooring, pool and billiard balls, bowling balls, tennis balls, belting, shoe compositions, pavements, insulating materials, household and personal articles, chemical apparatus and equipment, buttons, flexible adhesives and coatings, waterproofing compositions, gaskets, washers, bumpers, machinery parts, ebonite and vulcanite compositions, and any other article adapted to be made therefrom.

By the use of the term "latex" herein is meant any of the milky or latioiferous saps or juices obtained from plants, more particularly those yielding caoutchouc.

By the term "caoutchouc" as used in this disclosure is meant rubber, gutta-percha, balata, rubber substitutes and similar substances having like properties in the form or state in which they exist as crude and refined latex, as well as compositions or mixtures thereof. Inasmuch as these various substances have essentially substantially identical physical and chemical properties and are regarded as equivalents, differing only in the proportions of resinous and proteinous matter contained therein, they may be spoken of generally by the term "caoutchouc". Under the specific mention of rubber, gutta-percha, and balata is to be understood, also, that the same may be wholly or partly in the latex form or state.

The term "casein" is intended to be generic to and to comprehend any or all caseinous, albuminous and proteinous matters in which casein or an equivalent element is an essential ingredient, or any mixture or composition thereof, and as may be obtained from milk, buttermilk, legumens, lentils, as well as may be found combined and mixed with various substances such as alkalies and other chemicals to form casein glues, water, oils, glycerin, tars, resins, waxes and the like. The casein may be used in the pure soluble or insoluble state or in the plastic, semi-plastic, dry or powdered form as may be more convenient for the purposes desired.

Inasmuch as no two articles produced in accordance with this invention would have the ingredients thereof in exactly the same proportions it is believed that it is non-essential to state any particular proportions of the compositions except as may be exemplified hereinafter.

The important feature of the compound is the addition of casein or similar material with the rubber or rubber-like material as crude or refined latex with or without whatever other ingredients may be found of value to make a new and useful compound. Among the said ingredients which have been found of value are filling materials, sulphides of antimony, sulphur, lime, calcium-carbonate, wood pulp, liquor, shellac, oils, resinous substances, ammonium-carbonate or compounds of ammonia, sodium fluoride, sodium silicate and glycerin.

The casein may be dissolved and added to the various kinds of latexes. Such mixture when subjected to heat not much above room temperatures and treated with acids and acid salts, for example sulphuric acid or sodium and sulphate, tends to coagulate or precipitate. By mixing casein with latex, a more efficient and satisfactory incorporating of the whole is obtained when coagulated or precipitated as above stated. The casein or caseinous substances, in the various forms herein described, may be worked into the rubber materials such as rubber, gutta-percha, balata and tars, rosin and resinous matters to form a rubber substitute or substitutes particularly adapted for insulating compounds. Balata may not be as useful due to its scarcity but when used is of especial use in the belting industry.

The value of using casein in compositions of rubber, gutta-percha, balata and the like, as above mentioned, lies in its insolubility under certain conditions and in its flexibility when combined with non-evaporating substances like oils and tars. Casein or caseinous matters combine readily with lime and other chemicals which have adhesive properties and are especially useful in a composition or compound used as waterproofing compositions. A sealing composition which has been found satisfactory in practice comprises, in proportions by weight,

| | Parts. |
|---|---|
| Casein | 100 |
| Ammonium hydrate | 15 |
| Linseed oil | 300 |
| Latex | 500 |
| Water | 350 |

Filling material as desired.

In making this composition, I have found it practical first to dissolve the casein in the ammonium hydrate and water and then add the latex to the resulting solution; the filling material and the linseed oil, which acts in part as a softener, are preferably added last to the composition. Moreover, some of the compositions formed by my invention take very readily to vulcanizing in any of the present methods of vulcanization wherein pure sulphur, sulphur compounds, sulphur baths and the cold sulphur process are usually employed. Vulcanization tends to harden and thus to waterproof casein under certain conditions of temperature and pressure.

While I have herein described the mode of combining certain ingredients to make a compound in accordance with my invention it is to be understood, however, that the invention is not limited to the particular ingredients or the mode of treatment herein described, but other ingredients having substantially the same or similar characteristics may be employed in substantially the same manner without departing from the spirit of the invention and the scope of the appended claim.

This application is a division of my pending application, Serial #753,972 filed December 4th, 1924, for reissue of United States Letters Patent #1,437,487 granted December 5th, 1922.

Having thus described my invention, I claim and desire to protect by Letters Patent of the United States.

A composition of matter having adhesive properties comprising caoutchouc latex, casein and ammonium carbonate.

In witness whereof, I have hereunto set my hand this 16th day of February, 1926.

ARTHUR BIDDLE.